A. S. GILBERT.
AUTOMATIC WEIGHING SCALE.
APPLICATION FILED NOV. 30, 1920.

1,405,203.

Patented Jan. 31, 1922.
2 SHEETS—SHEET 1.

INVENTOR:
ARTHUR S. GILBERT
BY George F. Lolke
ATTORNEY.

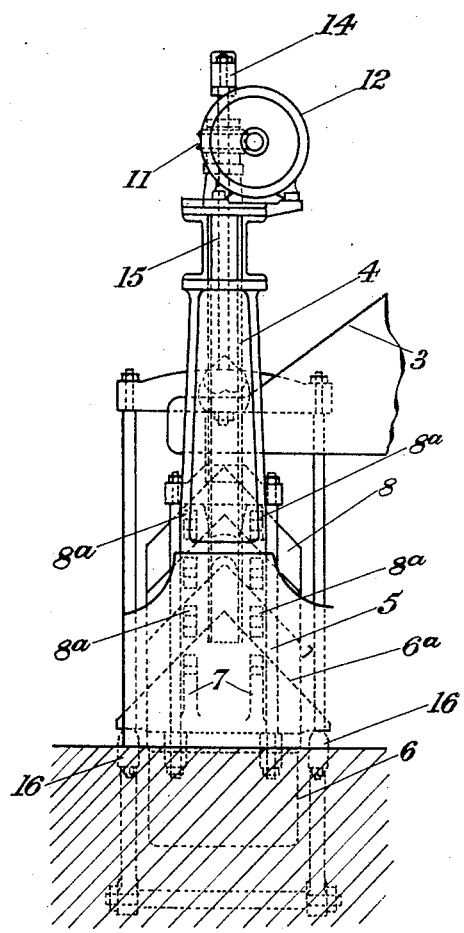

UNITED STATES PATENT OFFICE.

ARTHUR STUART GILBERT, OF BIRMINGHAM, ENGLAND, ASSIGNOR TO W. & T. AVERY, LIMITED, OF BIRMINGHAM, ENGLAND.

AUTOMATIC WEIGHING SCALE.

1,405,203.  Specification of Letters Patent.  Patented Jan. 31, 1922.

Application filed November 30, 1920. Serial No. 427,360.

*To all whom it may concern:*

Be it known that ARTHUR STUART GILBERT, a subject of the King of Great Britain, residing at Soho Foundry, Birmingham, England, has invented a new and useful Improvement Connected with Automatic Weighing Scales; and he does hereby declare the following to be a full, clear, and exact description of the same.

This invention has reference to improvements connected with automatic weighing scales and has for its object to employ a novel design of weights and improved means for connecting or disconnecting the said weights at will with the weighbeam of the scale, this invention preferably embodying a jack for raising and lowering the weights.

The invention comprises an automatic weighing scale wherein the weights are formed as a series of super-imposed members of inverted V section, said weights being adapted for connection at will with the weight box or weights end of the weighbeam, and adapted for removal therefrom and connection to a fixed framework or support with the aid of a lifting jack.

An automatic weighing scale according to the present invention will now be referred to which is of the even armed weighbeam type and the invention will be shown as applied to such a well known type of scale. The drawings illustrate the present invention and so much of the scale as is necessary to an understanding of the invention. In the drawings:—

Fig. 2 is an elevation at right angles to Fig. 1.

Figure 1:
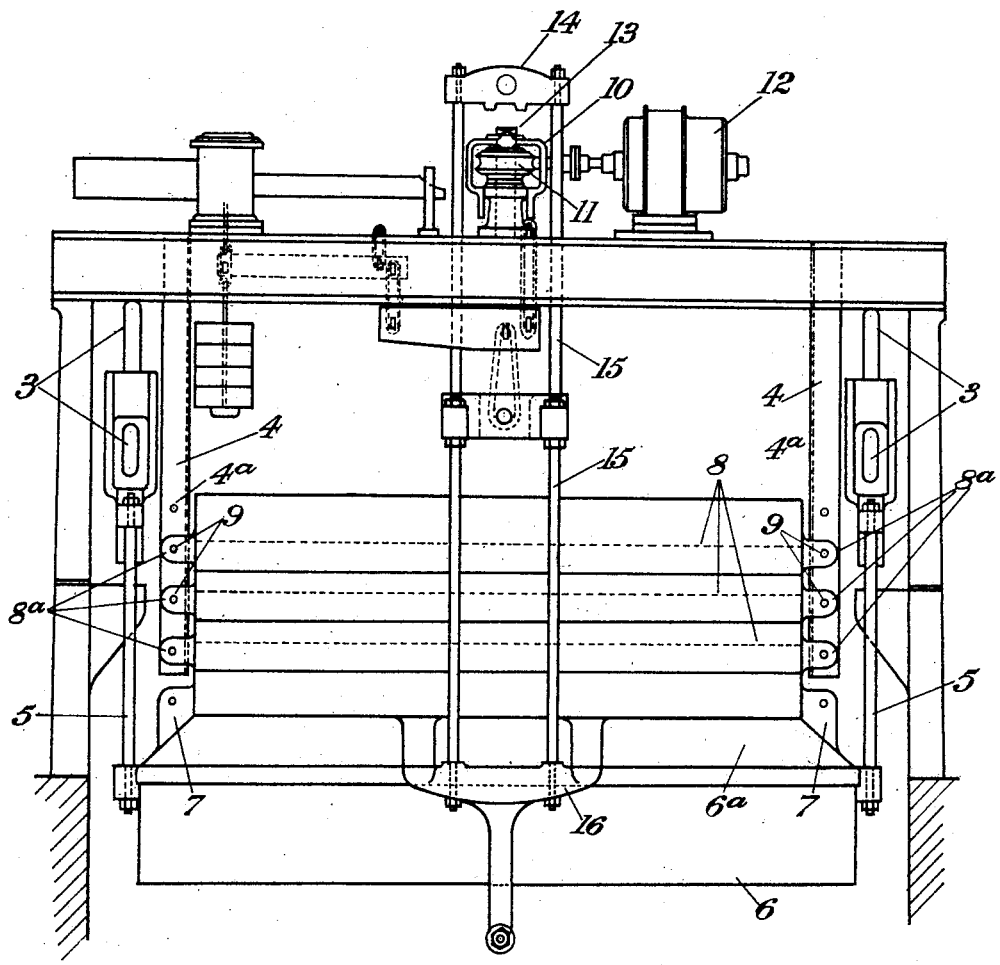
Fig. 1 is an end view of the scale looking on the weight box and weights end of the weighbeam.

Located at the weights end of the weighbeam 3 is a framework 4 within which are disposed suspension rods 5 from the weighbeam 3 said rods being connected at their lower ends to a weight box 6 which is formed with an inverted V top surface $6^a$, the top of this box is also provided with drilled lugs 7 at each end said lugs being adapted with the employment of pins to locate the lowest of a series of super-imposed weights 8 of inverted V section. When not required for use on the scale these weights 8 are carried by the frame supports 4 said supports being formed with holes $4^a$ therein and being embraced on each side by drilled lugs $8^a$ formed at the ends of each of the weights 8, the said weights being connected with the supports 4 by means of removable pins 9.

When it is desired to rest the weights 8 upon the weight box 6 and therefore depend them from the scale beam 3 the pins 9 which connect the weights 8 with the supports 4 of the framework are removed and the weights 8 automatically deposit themselves one on top of the other upon the weight box 6, but if it is desired to remove one or more of the weights 8 from the weight box 6 to the supports 4 on the framework the motor driven jack 10 is employed mounted on the scale framework, said jack being operated by a worm or other gearing 11 from the motor 12, and the screw 13 of the jack makes connection at its upper end with a yoke 14 which is connected to vertical rods 15 passing through the framework said rods being coupled to a yoke 16 at their lower end which is adapted to contact with the lowest of the series of super-imposed weights 8 and lift the series or one or more of the weights separately from the weight box 6, one or more of these weights can be coupled to the fixed support 4 by means of the pins 9, and if the operation of the jack 10 is reversed the scale is free to effect its ordinary weighment according to the number of weights still connected to the weight end of the beam 3.

Claims:—

1. An automatic weighing scale wherein the weights are formed as a series of superimposed members of inverted V section, a weighbeam to which said weights can be connected or disconnected at will, a lifting jack by means of which said weights are raised and lowered, and a fixed support to which the weights can be connected when disconnected from the weighbeam.

2. In an automatic weighing scale, a series of superimposed weights of inverted V section, a weighbeam to the weights end of which said weights can be connected, a fixed framework to which said weights can be connected, and a power operated screw jack for effecting the alternative positioning of the said weights.

3. In automatic weighing scales, a series of superimposed weights of inverted V section, a weight box on which said weights can be deposited, a scale beam from which said weight box is suspended, a framework to which said weights can be connected, and a power operated raising and lowering gear controlling the location of said weights.

In testimony whereof, I have signed my name to this specification.

ARTHUR STUART GILBERT.